United States Patent Office 3,582,423
Patented June 1, 1971

3,582,423
PROCESS FOR COATING POROUS SUBSTRATES
Tsu Huai Wang, Wilmington, Del., assignor to Wilmington Chemical Corporation, Wilmington, Del.
No Drawing. Filed Dec. 19, 1966, Ser. No. 602,545
Int. Cl. D06n *3/08*
U.S. Cl. 156—232   6 Claims

ABSTRACT OF THE DISCLOSURE

Coating pliable porous substrates like foams and textiles with tough pliable protective layers prepared from linear 700 to 5000 molecular weight hydrophobic dialcohols having an alcohol group at each end of the molecule which dialcohol is reacted with diisocyanate to attach free diisocyanate-carrying groups at each end, and then reacting the resultant material with slight excess of p,p'-methylene dianiline.

---

Among the objects of the present invention is the provision of novel coated pliable and porous substrates that have particularly desirable characteristics, as well as compositions and coating methods for producing such articles.

The above as well as additional objects of the present invention will be more clearly understood from the following description of several of its exemplifications.

According to the present invention a soft pliable substrate has a tough elastomeric coating of a condensate of linear hydrophobic polymer blocks having a molecular weight from about 700 to about 5000 and each end of these blocks terminates in an alcohol group, the blocks being first reacted with an organic diisocyanate and then condensed with p,p'-methylene dianiline, the molar ratio of the isocyanate group to the hydroxyl groups being from about 1.1:1 to about 2:1, the diamine being in an amount about 2 to 6% in excess of that required for each amine group to react with an isocyanate group, and the condensate having a molecular weight between about 40,000 and about 200,000. These coatings are exceptionally yieldable as well as tough, even though they are not plasticized.

The blocks are preferably polyester or polyglycol blocks, but they can have other structures, such as polysiloxane or polyacetal configurations. Such hydroxyl-terminated blocks react with the excess of diisocyanate to increase their length and change their terminations from hydroxyl to isocyanate. It is preferred to have the lengthening relatively modest as by having the isocyanate to hydroxyl mol proportion between about 1.5:1 and 2:1. Mol proportions below 1.5:1 cause the lengthening to be accompanied by a great deal of coupling of blocks together. Blocks that have less than about four carbons on an average between hydrophilic groups such as oxygen in the linear chain, are considered hydrophilic and are not desired because their hydrophilic character carries over to the final product. Thus polypropylene glycols and polyethylene glycols should be avoided although polyesters of these glycols with acids having at least six carbons are quite suitable.

The excess of amine is highly critical and is preferably only about 4 to 5%. Excesses smaller than about 2% give condensates whose solubilities are very low so that they are difficult to apply. Excesses greater than 6% on the other hand, produce condensates that tend to be weak and tacky, and accordingly undesirable.

The condensates resulting from a 4 to 5% excess of amine are soluble to the extent of at least about 15% by weight in dimethyl formamide or dimethyl formamide mixed with lower ketones such as those having up to about 9 carbon atoms per molecule. This solubility enables these condensates to be readily applied from solution. On porous substrates such as foams or textiles, however, the coating solution tends to be excessively absorbed into the interior of the substrate. In order to keep from materially changing the characteristics of the substrate or from using too much coating material, the solution can be first applied on a temporary carrier where it is dried to form the outer layer of the coating, and then a second coat, usually thinner, applied and used as an adhesive to bond the coating to the porous substrate. The solvent remaining in the adhesive layer can be evaporated through the porous substrate. The dried coating can also be adhered to a foam substrate that has had its surface subjected to direct flame for a period short enough to keep from damaging the foam but long enough to render the surface adherent. Also the foam can be formed on the pre-cast coating, as by pouring the foam-producing liquid mixture over the dried coating on the temporary carrier. A single undried or partially dried coating layer can alternatively be pressed against the substrate and the drying then completed to produce the final product.

The temporary carrier preferably has a non-adherent surface so that it can be readily separated from the coating after all solvent is evaporated, for instance. A thin layer of a parting material such as a silicone oil or polytetrafluoroethylene or polyethylene on the carrier is effective for this purpose. A polyethylene film itself also makes a good temporary carrier. The temporary carrier can also be made readily removable by other techniques, such as having the carrier of material that dissolves in a solvent in which the coating is not soluble, or that can be melted away from the coated substrate.

The p,p'-methylene dianiline

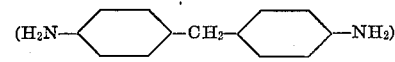

gives outstanding results in the above combination. Other primary aromatic dianilines such as 1,1-ethylene-p,p'-dianiline, 2,2-propylene-m,m'-dianiline, 1,2-ethylene-p,p'-dianiline, 4,4'-methylene-bis-(3-methyl-aniline), 1,1,1-trifluoro-ethylidene - 2 - (4')-aniline - 2 - (4') - 2' - ethyl-aniline, etc., having molecular weights up to 400 can also be used but are not preferred.

Any residual amino groups in the final condensate can be rendered less active, as by treatment of the condensate with a little formaldehyde or with uncured formaldehyde resins like urea-formaldehyde and phenol-formaldehyde resins. In addition, or in lieu of such treatment, a little monoethanolamine can be substituted for about 1% of the diamine before it is reacted.

A small amount of cross-linking agent such as up to 2% of a triisocyanate based on the mol concentration of the diamine can also be present in the condensation reaction, but is preferably avoided where the condensate is to be made highly extensible, as for coating a very yieldable foam. Such a triisocyanate is desirably made by reacting trimethylolpropane or other triols having molecular weights up to about 5000, with a diisocyanate in molar proportions of about 1.5 to 2 diisocyanate groups for each hydroxyl group. Tetrols can be similarly reacted with diisocyanates, and triisocyanates can be used in place of the diisocyanates in either of these reactions.

The following working examples will further illustrate the present invention, all parts being by weight unless otherwise specified.

EXAMPLE I

Formulation

Step 1:                                                   Parts
  Polyethylene glycol adipate having terminal
    OH groups and an OH content of 1.5% __   74.00
  p,p'-Methylenediphenyl diisocyanate _____   19.75
  Dimethylformamide (dry) _____   93.75
Step 2:
  p,p'-Methylene dianiline _____    7.75
  Dimethylformamide (dry) _____  211.75

Procedure

Step 1.—Purge a reactor with nitrogen and charge the polyester into it. Heat the charge to 60–70° C. and hold until it is all melted. Charge the isocyanate into the melted polyester, raise the temperature to 100–110° C. and hold at this temperature for 1 hour. Then add the dimethylformamide, mix well and cool to room temperature.

Step 2.—Dissolve the p,p'-methylene dianiline in the dimethyl formamide, charge the resulting solution into the mixture resulting from Step 1, and mix well for 1–2 hours.

The final product is a solution containing about 25% by weight of the condensate. This solution is applied as a layer about 10 mils thick to a polytetrafluoroethylene-coated release paper that is patterned by embossing to impart a leather-like grain effect to any material cast against the paper. The paper carrying the solution is held for about 2 minutes at 250° F. to evaporate the solvent. A second layer of solution about 3 mils thick (wet) is applied over the dried layer and a soft polyester polyurethane foam pad is then pressed against the undried second layer. The laminated combination is dried for two minutes at 250° F. after which the release paper is pulled away. The paper comes away cleanly leaving a foam pad with a thin skin that is exceedingly tough, yet quite stretchy. The coated foam pad has all the resiliency and softness it had before it was coated notwithstanding the absence of plasticizer in the coating. The coated pad is highly resistant to abrasion and its surface is sealed against absorption of water or gas. It is also resistant to dry cleaning solvents and is not tacky. Its characteristics are better noted from the following numerical values:

Tensile strength, p.s.i. _____  6000
Elongation, percent _____   600
Abrasion resistance (mgs. lost/1000 cycles—Taber
  CS–17 wheel) _____     0.5

EXAMPLE II

Formulation

Step 1:                                                  Parts
  Polypropylene (1,2) glycol adipate having terminal OH groups and an OH content of
    1.6% _____  200.00
  2,4-toluene diisocyanate _____   28.25
  Methyl isobutyl ketone _____   57.05
Step 2:
  p,p'-Methylene dianiline _____   14.15
  Dimethylformamide (dry) _____  508.55
  Carbon black _____    3.00

The procedure for this example is exactly like that for Example I except that the polyester of Example II is normally liquid, it is mixed with the diisocyanate at a temperature below 40° C. for an hour and the heating of this mixture is for two hours at 75–80° C.

The coating mixture of Example II is ready for immediate use and has about 30% by weight of the condensate. It can be applied in the same way as described above in connection with Example I to form a 5-mil thick (wet) coating adhered onto a knitted nylon rayon textile suitable for making ladies' gloves (40 by 35-denier filament). The thinner coating layers means that the solvent evaporation on the release paper can be effected in about one minute after which the textile can be pressed against the sticky condensate. The solvent evaporation continues during the pressing operation and should be substantially complete after another half minute or so. Very durable gloves are made from this coated product. Such gloves look and wear like leather.

The following are some measured characteristics of the pigmented coating:

Tensile strength, p.s.i. _____   259
300% modulus, p.s.i. _____   205
100% modulus, p.s.i. _____   187
2% modulus, p.s.i. _____    42.6
Elongation, percent _____   740
Elongation set, percent _____    62
Split tear, p.i. _____  [1] 63.2
Tensile at yield, p.s.i. _____    85
Elongation at yield, p.s.i. _____    11

[1] Tear was more like a tensile.

The very low modulus at 2% elongation shows that the coating has a very desirable soft hand.

EXAMPLE III

Formulation

Step 1:                                                  Parts
  Polytetramethylene glycol with an OH content of 1.7% _____ 1000.0
  2,4-toluene diisocyanate _____  266.5
  Methyl ethyl ketone _____  542.5
Step 2:
  p,p'-Methylene dianiline _____   99.5
  Methyl ethyl ketone _____ 1051.0
  Dimethylformamide (dry) _____ 1593.5

Procedure

Step 1.—Purge the reactor with nitrogen and charge the polytetramethylene glycol which has been pre-melted, together with the isocyanate and MEK. Raise the temperature to 70–75° C. and hold for three hours, then cool to room temperature.

Step 2.—Dissolve the p,p'-methylene dianiline in the solvent mixture, and charge the amine solution into the prepolymer solution of Step 1. Mix well for 1–2 hours at room temperature.

The following diol blocks can be substituted in equimolar amounts for the polyester of Example I, to give similarly desirable products:

polytetramethylene glycol having a molecular weight of 2500,
epsilon caprolactone that has been polymerized to a molecular weight of about 4400.

Similarly the diisocyanate of Example II can be replaced by the following without significantly affecting the product:

p,p'-methylenediphenyl diisocyanate
hydrogenated p,p'-methylenediphenyl diisocyanate
bis(2-isocyanatoethyl) fumarate All the reactants used to make the product of the present invention can be simple compounds, that is having no substituents other than hydrocarbyl groups, or they can have substituents like fluorine, chlorine or urethane or urea groups or the like that do not interfere with the desired reactions so that the alcohol groups of the initial blocks, the isocyanate groups of the diisocyanate, and the amino groups of the diamine are the sole reactive groups. It is preferred that the diisocyanate have a molecular weight no larger than about 500.

In general the coatings of the present invention can have thicknesses of from about 1 to about 30 mils. Greater thicknesses do not add significantly to the protection these coatings provide and unduly extend the time required to dry the coatings. It is a feature of the present invention that wet coatings up to about 20 mils thick can be applied on a production line moving at the of 12 linear yards or more per minute to form a product that can be immediately used or shipped.

The thinner coatings are best applied by roller coating or spraying and the thicker by knife coating or flow coating. The temporary carriers can be provided with any kind of surface finish, both grained and ungrained. Because of the absence of plasticizer the coatings of the present invention do not undergo perceptible change in characteristics upon aging except for the conventional darkening where the coatings are very light in color. A small amount of pigment such as 1 to 6% carbon black, phthalocyanine blue, chrome green or red iron oxide can be mixed into coating formulations to make them more decorative and also mask out such color change.

The coated foams and fabrics of the present invention are very well suited for upholstery materials, particularly in automobiles, airplanes and the like.

Obviously many modifications and variations of the present invention are possible in the light of the above teachings. It is, therefore, to be understood that within the scope of the appended claims the invention may be practiced otherwise than as specifically described.

What is claimed:

1. A method of applying a protective coating on a porous substrate, said method comprising (a) applying to a temporary carrier having a nonadherent surface a layer of a tough elastomeric condensate of linear hydrophobic polymer blocks having a molecular weight from about 700 to about 5,000, each end of these blocks terminating in an alcohol group, the blocks being first reacted with an organic diisocyanate and then condensed with p,p'-methylene dianiline, the molar ratio of the isocyanate groups to the hydroxyl groups being from about 1.1:1 to about 2:1, the p,p'-methylene dianiline being in an amount about 2 to 6% in excess of that required for each amine group to react with an isocyanate group, and the condensate having a molecular weight between about 40,000 and about 200,000, (b) applying over said layer an at least 15 weight percent solution of such condensate in essentially dimethyl formamide, (c) promptly evaporating nearly all the solvent from the applied solution, (d) pressing the surface of the substrate against the resulting condensate, (e) promptly withdrawing the pressed substrate with the applied condensate adhering to its surface from the temporary support and completing the evaporation of the solvent.

2. A method of applying a protective coating on a porous substrate, said method comprising (a) applying to a temporary carrier having a nonadherent surface an at least 15 weight percent solution in essentially dimethyl formamide of a tough elastomeric condensate of linear hydrophobic polymer blocks having a molecular weight from about 700 to about 5,000, each end of these blocks terminating in an alcohol group, the blocks being first reacted with an organic diisocyanate and then condensed with p,p'-methylene dianiline, the molar ratio of the isocyanate groups to the hydroxyl groups being from about 1.1:1 to about 2:1, the p,p'-methylene dianiline being in an amount about 2 to 6% in excess of that required for each amine group to react with an isocyanate group, and the condensate having a molecular weight between about 40,000 and about 200,000, (b) promptly evaporating nearly all the solvent from the applied solution, (c) pressing the surface of the substrate against the resulting condensate layer, (d) promptly withdrawing the pressed substrate with the condensate layer adhering to its surface from the temporary support, and completing the evaporation of the solvent.

3. The combination of claim 2 in which the porous substrate is a yieldable foam, the surface of the temporary support is patterned and the protective coating takes a pattern which is the negative of the supporting pattern.

4. The combinaion of claim 2 in which the substrate is pliable, the blocks have a molecular weight of about 2000, the molar ratio of the isocyanate groups to the hydroxyl groups is between 1.5:1 and 2:1, and the p,p'-methylene dianiline excess is between 4 and 5%, and the condensate has a molecular weight between 50,000 and 100,000.

5. The combination of claim 4 in which the applied solution contains at least 25 weight percent of the condensate.

6. The combination of claim 5 in which the solution is applied as a layer no thicker than 20 mils.

References Cited

UNITED STATES PATENTS

| | | | |
|---|---|---|---|
| 3,255,061 | 6/1966 | Dobbs | 156—232X |
| 3,393,106 | 7/1968 | Marrinan et al. | 156—232 |

LELAND A. SEBASTIAN, Primary Examiner

U.S. Cl. X.R.

156—236, 247, 332; 161—190, 406, Dig. 2; 260—32.6